US007005966B1

(12) United States Patent
Leman et al.

(10) Patent No.: US 7,005,966 B1
(45) Date of Patent: Feb. 28, 2006

(54) REMOTE COMPUTER CONTROLLER AND CONTROL METHOD

(75) Inventors: Michael V. Leman, Eagle, ID (US); William M. Creese, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/574,736

(22) Filed: May 18, 2000

(51) Int. Cl.
*H04Q 5/22* (2006.01)

(52) U.S. Cl. ................. 340/10.4; 340/10.1; 340/10.34; 340/10.2; 340/480; 340/825.69; 340/825.72; 340/5.6; 340/5.61; 340/5.64; 713/185; 710/73; 710/106

(58) Field of Classification Search ........... 340/825.69, 340/825.72, 5.61, 5.62, 5.64, 5.74, 10.1, 340/10.34, 10.2, 480; 710/73, 72, 13, 106; 713/200, 324, 330, 310, 185; 341/176; 455/419, 455/418, 343
See application file for complete search history.

(56) References Cited

U.S. PATENT DOCUMENTS 4,308,615 A 12/1981 Koegel et al.
4,531,740 A 7/1985 Green et al.
4,639,881 A 1/1987 Zingher
4,647,721 A 3/1987 Busam et al.
4,751,578 A 6/1988 Reiter et al.
4,998,240 A 3/1991 Williams
5,014,218 A 5/1991 Crain et al.
5,051,720 A 9/1991 Kittirutsunetorn
5,107,258 A 4/1992 Soum
5,204,768 A 4/1993 Tsakuris et al.
5,388,211 A 2/1995 Hornbuckle
5,408,582 A 4/1995 Colier
5,457,478 A 10/1995 Frank
5,457,742 A 10/1995 Vallillee et al.
5,497,479 A 3/1996 Hornbuckle
5,521,631 A 5/1996 Budow et al.
5,596,628 A 1/1997 Klein
5,613,089 A 3/1997 Hornbuckle
5,641,319 A 6/1997 Stoel et al.
5,650,774 A 7/1997 Drori
5,692,214 A 11/1997 Levine
5,742,514 A 4/1998 Bonola
5,801,689 A 9/1998 Huntsman
5,812,115 A 9/1998 Fan et al.
5,856,789 A 1/1999 Huang
5,948,084 A * 9/1999 Ha .............................. 710/73
6,289,464 B1 * 9/2001 Wecker et al. .............. 713/300
6,311,282 B1 * 10/2001 Nelson et al. .............. 713/324
6,392,534 B1 * 5/2002 Flick .......................... 340/826
6,396,438 B1 * 5/2002 Seal ........................... 342/127
6,675,300 B1 * 1/2004 Jung et al. .................. 713/200

FOREIGN PATENT DOCUMENTS

JP 409282065 * 10/1997

* cited by examiner

*Primary Examiner*—Michael Horabik
*Assistant Examiner*—Vernal Brown
(74) *Attorney, Agent, or Firm*—Knobbe, Martens, Olson & Bear, LLP

(57) ABSTRACT

A computer system is configured to be powered up by a hand-held controller. The hand-held controller is in wireless communication with a computer. One or more buttons on the hand-held controller may be used to automatically launch a particular application program which has been pre-selected by a computer user after completing the power up process.

13 Claims, 3 Drawing Sheets

REMOTE COMPUTER CONTROLLER AND CONTROL METHOD

BACKGROUND

1. Field of the Invention

The invention relates to remote control of computers.

2. Description of the Related Art

In today's business world, personal computers are almost a necessity, and are commonly found in offices and employee workspaces. Generally, people turn their computer off when they leave the office after work in the evening. This is done to conserve energy, to address safety concerns common to all energized electrical appliances, and also in response to security concerns that someone other than the computer owner may gain access to sensitive business information. Thus, when most people arrive at the office in the morning, they must turn on their computer, wait for the system to boot up, and then launch some particular application program they will be using. This results in wasted time as the user sits and waits for the computer to complete the boot up process.

Currently, no computer system is available that addresses this problem. Various types of remote control systems for computers have been described and marketed, but none are particularly suitable for resolving the above described problem. Many conventional remote computer controllers, wireless mice and keyboards, for example, have a very short communication range, and/or require a clear line of sight between the wireless transmitter in the device and the receiver in the computer. This makes them impractical for use by a worker until entering the office. There would therefore be minimal, if any, time savings involved with the use of these devices to control initiation of computer operation.

Other remote control devices work over telephone connections. One example of such a system is provided by U.S. Pat. No. 5,596,628 to Jon Klein. These systems, however, require the initiation of a telephone connection with the computer to be controlled. This is not convenient for solving the above described problem. For these reasons, a convenient and simple to operate computer system with remote computer power control is needed in the art.

SUMMARY

The invention includes remotely controllable computer systems, methods of remote computer control, and devices for the remote control of computers. In one embodiment, the invention comprises a remote controlled computer system, including a computer comprising a wireless receiver and a hand-held controller comprising a wireless transmitter. The hand-held controller is configured to send a signal to the wireless receiver upon user actuation, and the computer is configured to perform a power on sequence and to launch a user-defined application program in response to receiving the signal.

In another embodiment the invention comprises a method of remotely controlling a computer comprising transmitting a signal from a hand-held controller to the computer, and in response thereto, placing the computer in an on state and launching a user specified application program.

One embodiment of a remote control device for a personal computer comprises a hand-held housing containing wireless signal transmission circuitry for communicating with wireless signal receiving circuitry in the personal computer. The housing comprises an attachment device for connecting the remote control device to a key ring, purse handle, or other commonly carried personal item. In another embodiment, a remote control device for a personal computer comprises a hand-held housing containing wireless signal transmission circuitry for communicating with wireless signal receiving circuitry in the personal computer and at least one user actuated control operative to initiate wireless signal transmission of a command to perform a power up sequence and launch a selected application program.

DETAILED DESCRIPTION OF THE INVENTION

Embodiments of the invention will now be described with reference to the accompanying Figures, wherein like numerals refer to like elements throughout. The terminology used in the description presented herein is not intended to be in interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
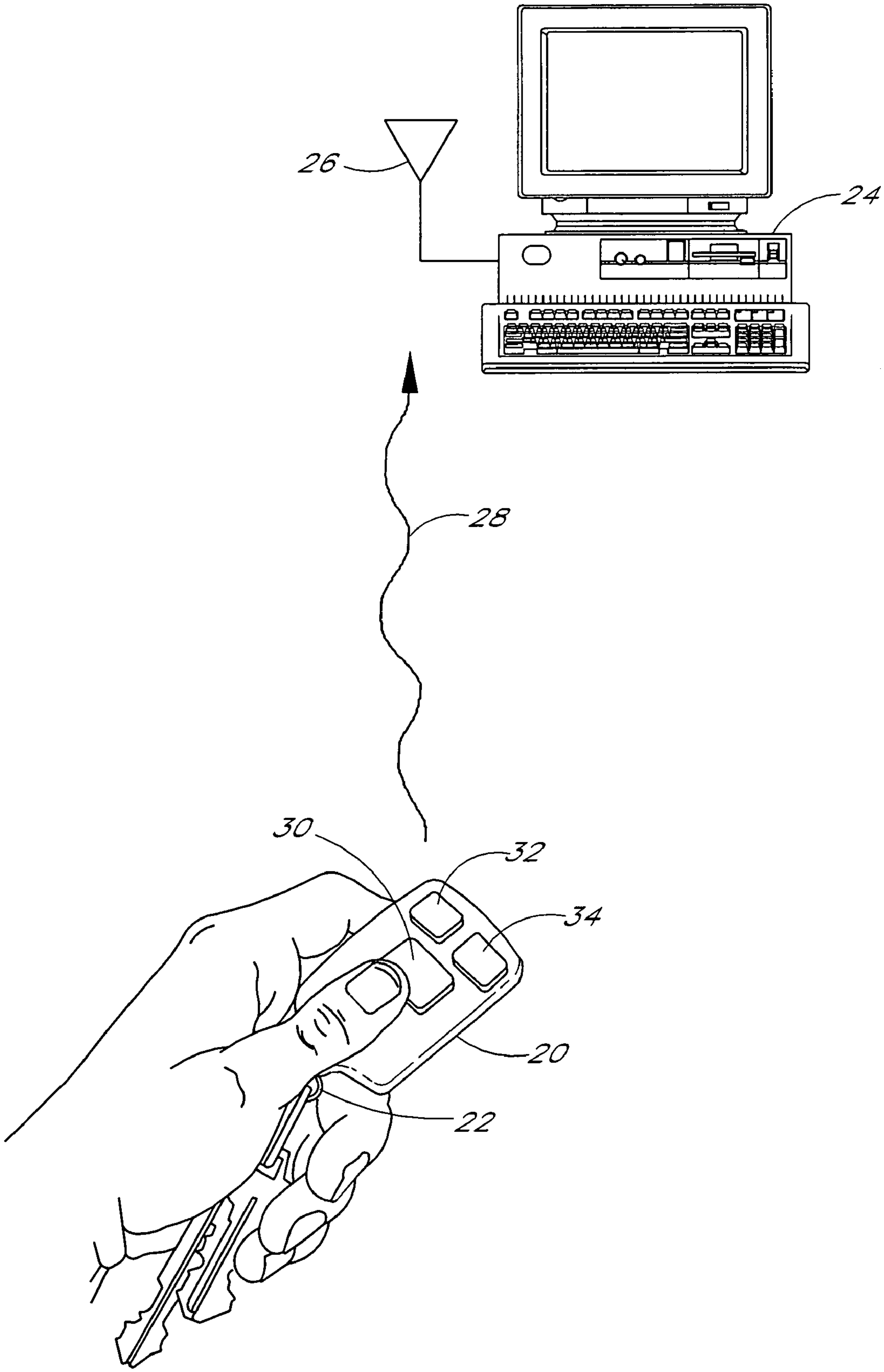
FIG. 1 is an overall perspective view of a hand-held computer controller in wireless communication with a personal computer according to one embodiment of the invention.

Referring now to FIG. 1, a computer system in accordance with one embodiment of the invention comprises a controller 20. The controller 20 is advantageously small enough to fit comfortably in a person's hand as well as in a pocket, purse, automobile glove compartment, or the like. In one embodiment, the controller 20 comprises an attachment device 22. The attachment device 22 may be a suitably sized hole, a wire loop or ring, or other facility for attaching the controller 20 to a key ring, purse handle, or other commonly carried personal item.

The controller 20 also incorporates internal wireless transmission circuitry and an antenna (not shown) for wireless communication with a computer 24 that incorporates an antenna 26 and a wireless receiver. These aspects of the computer 24 will be described in more detail below with reference to FIG. 3. Using a wireless link 28, the controller 20 sends commands to the computer 24. In one embodiment, the commands issued by the controller 20 are operative to place the computer in the on state and optionally to also launch a user specified application program such as a word processor, spreadsheet, web browser, CAD and CAE programs, etc.

As shown in FIG. 1, one embodiment of the controller 20 has three user actuated push buttons. A first button 30 may initiate only computer 24 power up, but not launch any specific application programs. A second button 32 may initiate both power up and the launch of a first user defined application program. A third button 34 may initiate both power up and the launch of a second user defined application program. Thus, the user may have a choice of several different remote control operations. This embodiment may be used to eliminate time wasted by computer users while waiting for their computer to boot up and load a desired application program. In a business or office environment, for example, a computer user may prefer to have their office computer on and running the moment they arrive at the office. In this embodiment, an advantageous range for the communication link 28 may be between approximately 200 and 500 feet. With this range, as the user is heading toward the office, they can press a button 30, 32, 34 on the controller 20, thereby initiating either only power up, or also power up plus the launch of a desired application. When they arrive at the office door a few minutes later, the computer is ready and waiting for them.

The construction of wireless transmitter and receiver circuitry suitable for implementing the wireless link 28 is well known and will not be described in detail herein. This technology is used in applications such as garage door openers, keyless entry systems for automobiles, as well as other currently available commercial applications, and a wide variety of specific designs could be used in the controller 20 and computer 24 without altering the character of the system. The 200 to 500 foot range may be advantageous in that it is far enough to generally provide two or more minutes between initiation of power up and arrival of the user at the computer 24, but it is not so far to become an excessive drain on one or more batteries internal to the controller 20. Longer ranges of 900 or more feet may also be advantageous, especially in those instances where the resulting reduction of battery life is not a major concern.

Figure 2:
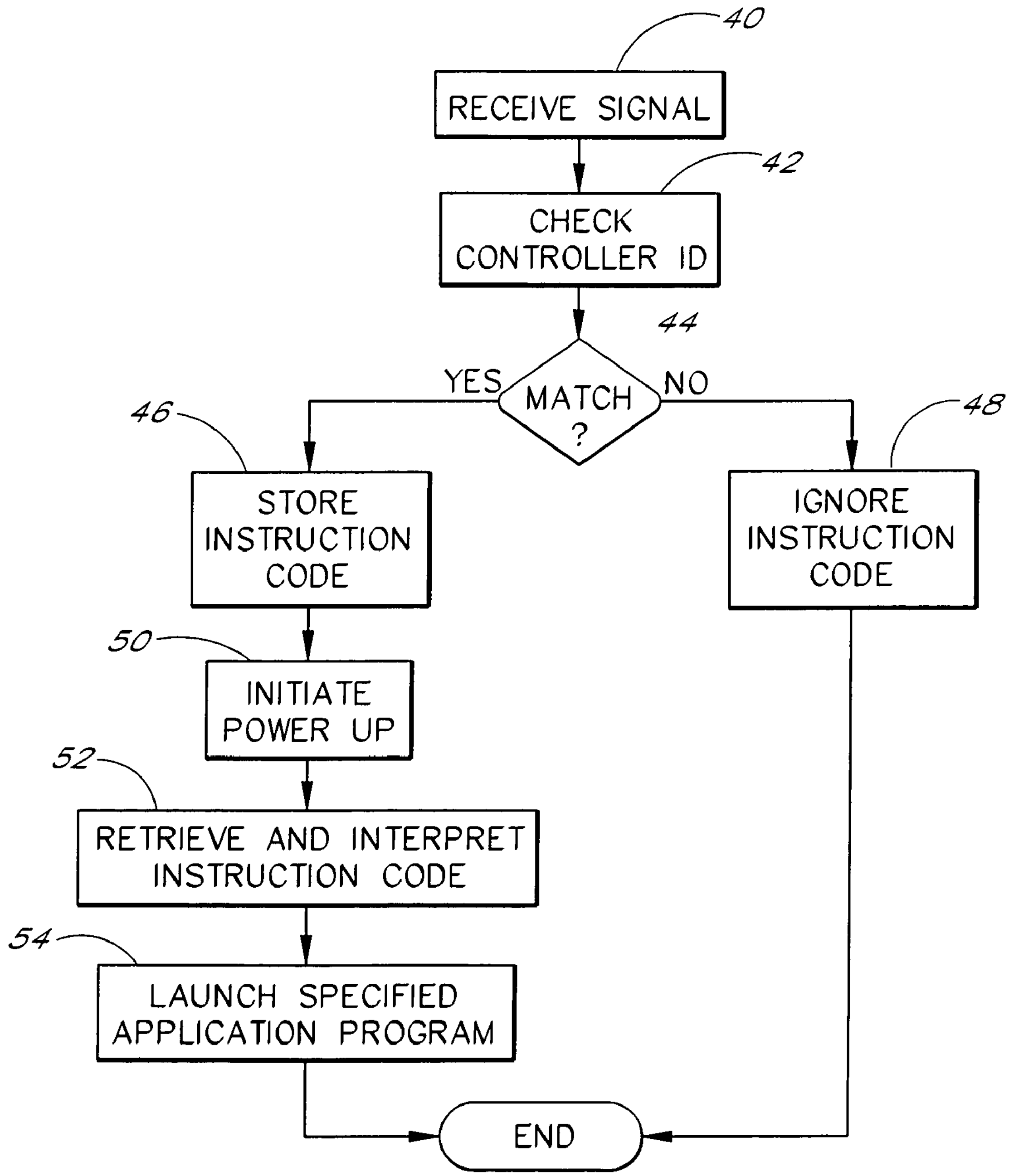
FIG. 2 is flow chart illustrating steps performed by a computer in response to received control signals according to one embodiment of the invention.

One embodiment of a method of response of the computer 24 to the actuation of the buttons 30, 32, 34 on the controller 20 is illustrated in FIG. 2. The method begins at step 40 when the computer 24 receives a wireless transmission signal from the controller 20. As also shown below in FIG. 3, the wireless message reception and analysis circuitry in the computer 24 is continually in the on-state, even when the remainder of the computer 24 is in an off-state. The signal received by the computer 24 advantageously includes at least two pieces of information for use by the computer 24. The first is a controller hardware identification code. The second is an instruction code that designates which application program, if any, should be launched.

At the next step 42, the computer 24 checks the controller hardware identification code, and compares it to an internally stored identification code. If, at step 44, these two codes match, the computer 24 accepts the remainder of the transmitted data and, at step 46, stores the transmitted instruction code. If the codes do not match, at step 48 the computer 24 ignores the remainder of the message. In analogy with garage door openers and automotive keyless entry systems, this step 42 allows simultaneous use of different controllers 20 in proximity to one another in a single office building for example. In this way, the computer 24 only responds to control instructions from the controller 20 in the possession of the operator of the computer 24.

After storing the instruction code, at step 50 the computer initiates a power up sequence. As described below with reference to FIG. 3, this step advantageously includes activating the computer power supply and loading the operating system software. At step 52, the computer 24 retrieves and interprets the stored instruction code, and at step 54, the computer launches the appropriate application program as specified by the retrieved instruction code.

Figure 3:
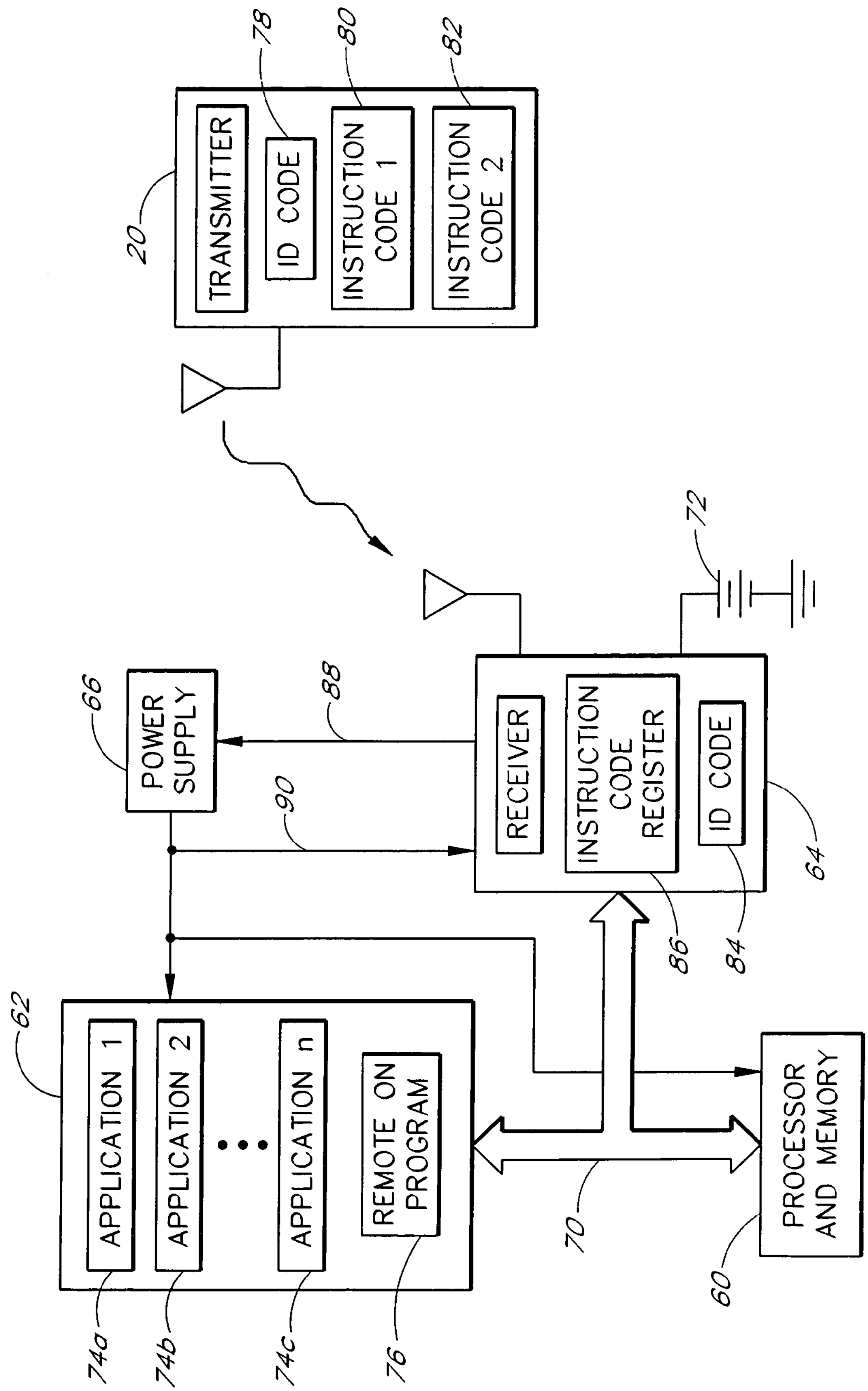
FIG. 3 is a block diagram of a computer system configured to receive and interpret control signals according to one embodiment of the invention.

Referring now to FIG. 3, the computer 24 advantageously includes a processor and memory circuitry 60 and a storage device 62 that may, for example, comprise a hard disk drive. The computer 24 also includes remote control interface circuitry 64 for receiving signals and/or data from the remote transmitter 20. The computer 24 further includes a power supply 66 that supplies power to all of the electrical components of the computer 24. The processor and memory circuits 60, the storage device 62, and the remote control interface circuitry 64 are coupled through a bus system 70. Although not illustrated for purposes of clarity, those of skill in the art will appreciate that the bus system 70 will typically comprise a set of busses of varying format that communicate through bridge circuitry. The remote control interface circuitry 64 may be incorporated into the computer 24 in a variety of ways. It may comprise a daughter printed circuit board which plugs into an expansion slot in the computer 24. Alternatively, it may be incorporated directly onto a motherboard in the computer 24 that also mounts the processor and memory circuits 60. The remote control interface circuitry 64 is continually powered by a battery 72 so that it can receive and process wireless signals transmitted to the computer 24 even when the computer 24 is in an off state.

The storage device 62 stores, among other things, several application programs 74*a*, 74*b*, 74*c*. As discussed above, it is one of these programs that the user may wish to remotely launch. The storage device 62 also contains a remote on program 76. In this embodiment, the remote controller 20 sends a signal to the remote control interface circuitry 64 which includes the controller identification code 78 and one of the instruction codes 80 or 82. The remote control interface circuitry 64 then compares the received identification code with a stored identification code 84. If the two match, the remote control interface circuitry 64 stores the received instruction code in an instruction code register 86.

After storing the instruction code in the register 86, the remote control interface circuitry activates the power supply 66 by asserting an output 88 which is connected to the power supply circuitry 66. This may be accomplished in a wide variety of ways which are well understood by those in the art. Asserting the output line 88 may close a relay in the AC power lines to the power supply, for example. In an advantageous embodiment, the power supply includes a low voltage secondary on/off signal line that toggles the supply from an off state to an on state when asserted. In this embodiment, the output 88 is coupled to this secondary on/off signal line.

Upon the application of power, the computer 24 will load its operating system software. A variety of operating systems are currently utilized in the computer industry, including Unix™, Linux™, DOS™, and Windows™. At this time, a large majority of the currently commercially available personal computers automatically load Windows™ upon power up. Furthermore, Windows™ includes a Startup utility, which allows the user to list one or more application programs that Windows™ will load and run automatically when the computer 24 is powered up.

In the embodiment of FIG. 3, the remote on program 76 is listed in the Startup utility for automatic launch when the computer is powered up. The remote on program 76 causes the computer to perform an I/O operation to retrieve the instruction code stored in the instruction code register 86. Using a table which is part of the remote on program 76 that cross references instruction codes with application programs 74*a*, 74*b*, 74*c*, the remote on program 76 determines which application program the user wishes to have launched, and initiates the loading of this user selected application program.

With the controller 20 illustrated in FIG. 1, depending on the button 30, 32, 34 pushed on the remote controller 20, different instruction codes will be sent and stored in the instruction code register 86, resulting in the launch of different application programs. If the user only wants to power the computer up without launching a program, this may be accomplished by sending, for example, all zeros as an instruction code when the appropriate button 30 is pushed on the controller 20. This may be interpreted by the remote on program 76 as an instruction to load no additional application program. In addition, the remote control interface circuitry could be provided with a connection 90 to the power supply output. In an embodiment with this connection 90, if the power supply is activated locally with the power switch, the power supply output may be sensed, and the remote control interface circuit could be configured load zeros into the instruction code register in response so that no application program is automatically loaded as may be the case with the remote power up procedure. A convenient remote controller is therefore provided which is easy to carry, simple to operate, and which saves computer users time.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A remote controlled computer system, comprising:

a computer comprising a wireless receiver configured for radio frequency communication, wherein the wireless receiver comprises a printed circuit board that is configured to connect with an expansion slot of the computer, and wherein the wireless receiver comprises a battery for powering the wireless receiver;

a hand-held controller comprising a wireless transmitter and an attachment device for attaching the hand-held controller to a key ring, purse handle, or other commonly carried personal item;

wherein said hand-held controller is configured to send a signal to said wireless receiver upon user actuation, and wherein said computer is configured to perform a power on sequence and to launch a user-defined application program in response to receiving said signal, wherein said wireless receiver and wireless transmitter have a communication range of approximately 200 to 500 feet, wherein said hand-held controller comprises at least three assigned buttons for actuating said signal, and wherein one of said assigned buttons initiates the power on sequence and the launching of a first user-defined application program, wherein another one of said assigned buttons initiates the power on sequence and the launching of a second user-defined application, and wherein another one of said assigned buttons initiates the power on sequence without launching of an application program.

2. The computer system of claim 1, wherein the wireless transmitter is configured for radio frequency communication.

3. A method of remotely controlling a computer comprising transmitting a signal from a hand-held controller to said computer, and in response thereto, placing said computer in an on state and launching a user specified application program, wherein said hand-held controller comprises at least three assigned buttons for actuating said signal, and wherein one of said assigned buttons initiates the power on sequence and the launching of a first user-defined application program, wherein another one of said assigned buttons initiates the power on sequence and the launching of a second user-defined application, and wherein another one of said assigned buttons initiates the power on sequence without launching of an application program, wherein said computer comprises a wireless receiver that includes a printed circuit board that is configured to connect with an expansion slot of the computer, and wherein the wireless receiver comprises a battery for powering the wireless receiver.

4. The method of claim 3 comprising the step of analyzing said signal to select an application for launch from a plurality of application programs.

5. The method of claim 3, wherein said transmitting occurs over a distance of approximately 200 to 500 feet.

6. A computer system, comprising:

a hand-held controller comprising a radio frequency transmitter, wherein said controller is configured to transmit at least first, second, and third different signals in response to at least first and second different user actuation operations, the hand-held controller further comprising an attachment device for attaching the hand-held controller to a portable object; and a computer comprising a radio frequency receiver; wherein said computer is configured to (1) receive said first, second, and third different signals, (2) analyze said first, second, and third different signals, (3) perform a power up sequence in response to either said first signal, said second signal, or said third signal, (4) launch a first application program in response to said first signal, and (5) launch a second application program in response to said second signal, and wherein the radio frequency receiver comprises a printed circuit board that is configured to connect with an expansion slot of the computer, and wherein the radio frequency receiver comprises a battery for powering the wireless receiver.

7. The computer system of claim 6, wherein said first and second different user actuation operations comprise depressing first and second buttons on said hand-held controller.

8. A remote control device for a personal computer comprising a hand-held housing containing wireless signal transmission circuitry for communicating with wireless signal receiving circuitry in said personal computer, wherein said housing comprises an attachment device for connecting said remote control device to a key ring, purse handle, or other commonly carried personal item, and wherein said hand-held controller comprises at least three assigned buttons for actuating said signal and wherein one of said assigned buttons initiates the power on sequence and the launching of a first user-defined application program and wherein another one of said assigned buttons initiates the power on sequence and the launching of a second user-defined application, and wherein another one of said assigned buttons initiates the power on sequence without launching of an application program, wherein the wireless signal receiving circuitry comprises a printed circuit board that is configured to connect with an expansion slot of the computer, and wherein the wireless signal receiving circuitry comprises a battery for powering the wireless signal receiving circuitry.

9. The remote control device of claim 8, additionally comprising a plurality of user actuated buttons for selecting from a plurality of remotely controlled personal computer functions.

10. The remote control device of claim 8, wherein said wireless transmission circuitry is configured to communicate with said wireless receiving circuitry over a range of approximately 200 to 500 feet.

11. A remote control device for a personal computer comprising:

a hand-held housing containing wireless signal transmission circuitry for communicating with wireless signal receiving circuitry in said personal computer, wherein said wireless signal receiving circuitry comprises a printed circuit board that is configured to connect with an expansion slot of the computer, and wherein the wireless signal receiving circuitry comprises a battery for powering the wireless receiver; and at least three user actuated controls operative to initiate wireless signal transmission from said remote control device of a command to said personal computer, and wherein one of said actuated controls initiates the power on sequence and the launching of a first user-defined application program, wherein another one of said actuated controls initiates the power on sequence and the launching of a second user-defined application, and wherein another one of said actuated controls initiates the power on sequence without launching of an application program.

12. The remote control device of claim 11, wherein said wireless transmission circuitry is configured to communicate with said wireless receiving circuitry over a range of approximately 200 to 500 feet.

13. A computer system comprising:

a computer comprising a power supply and a storage device storing application programs;

a wireless receiver that comprises a printed circuit board that is configured to connect with an expansion slot of the computer, and wherein the wireless receiver comprises a battery for powering the wireless receiver; and hand-held remote control means for activating said power supply and launching a selected one of said application programs from a distance of approximately 200 to 500 feet, and wherein said hand-held controller comprises at least three assigned buttons for initiating a power up of the computer and wherein one of said assigned buttons initiates the power on sequence and the launching of a first user-defined application program, wherein another one of said assigned buttons initiates the power on sequence and the launching of a second user-defined application, and wherein another one of said assigned buttons initiates the power on sequence without launching of an application program.

* * * * *